United States Patent [19]
von Branchel et al.

[11] 4,438,075
[45] Mar. 20, 1984

[54] PROCESS AND APPARATUS FOR THE PRODUCTION AND MAINTENANCE OF A FLUIDIZED LAYER IN HETEROGENEOUS SYSTEMS

[75] Inventors: Helmut von Branchel, Troisdorf-Spich; Georg Schreiber, Cologne-Rodenkirchen; Heinz Schroeder, Witten/Ruhr, all of Fed. Rep. of Germany

[73] Assignee: Dynamit Nobel Aktiengesellschaft, Troisdorf, Fed. Rep. of Germany

[21] Appl. No.: 912,309

[22] Filed: Jun. 5, 1978

Related U.S. Application Data

[63] Continuation of Ser. No. 713,583, Aug. 11, 1976, abandoned, which is a continuation-in-part of Ser. No. 681,474, Apr. 29, 1976, abandoned.

[30] Foreign Application Priority Data

Apr. 29, 1975 [DE] Fed. Rep. of Germany ..... 25189757

[51] Int. Cl.³ .............................................. B01D 11/04
[52] U.S. Cl. .................................... 422/189; 422/257
[58] Field of Search ................... 55/41, 43, 90, 92, 93, 55/186, 193; 209/254, 305, 306; 261/109, 110, 113, 114 TC; 422/195, 256, 190, 257, 191, 189; 210/21, 511; 366/337, 340

[56] References Cited

U.S. PATENT DOCUMENTS

| 291,264 | 1/1884 | Addie | 422/189 X |
| 1,124,830 | 1/1915 | Allen | 366/337 X |
| 1,133,110 | 3/1915 | DeFourcq | 422/189 X |
| 2,429,161 | 10/1947 | Hudson | 422/191 X |
| 3,045,984 | 7/1962 | Cochran | 366/340 |
| 3,190,729 | 6/1965 | Emmett et al. | 422/191 |
| 3,347,303 | 10/1967 | Herman | 366/340 X |
| 3,957,468 | 5/1976 | Voth et al. | 261/113 X |
| 4,118,313 | 10/1978 | Hadamovsky et al. | 422/257 X |

FOREIGN PATENT DOCUMENTS 1159396 12/1963 Fed. Rep. of Germany ...... 366/337

Primary Examiner—Frank A. Spear, Jr.
Attorney, Agent, or Firm—Antonelli & Terry & Wands

[57] ABSTRACT

A process for the production and maintenance of a fluidized layer in a heterogeneous system includes the steps of:

(1) setting a heterogeneous mass stream having a liquid as the continuous phase and a solid and/or gas as the disperse phase into fluidized motion in a column between two plates arranged superimposed and inclined in opposition to each other with respect to the horizontal, said plates forming a fluidizing cell and said fluidized motion being promoted by the force of gravity;

(2) enriching a heavier phase above the lower plate, especially in the lower region thereof, and causing said heavier phase to flow from there into the space below the lower plate;

(3) enriching a lighter phase below the upper plate, especially in the upper region thereof, and causing the lighter phase to flow from there into the space above the upper plate and/or to be discharged from there from the column; and (4) conducting the disperse phase in case of a density higher than that of the continuous phase, in a direction from the top toward the bottom through the column; or (5) conducting the disperse phase in case of a density lower than that of the continuous phase, in a direction from the bottom toward the top through the column.

5 Claims, 11 Drawing Figures

PROCESS AND APPARATUS FOR THE PRODUCTION AND MAINTENANCE OF A FLUIDIZED LAYER IN HETEROGENEOUS SYSTEMS

This is a continuation of application Ser. No. 713,583, filed Aug. 11, 1976, which in turn is a continuation-in-part of Ser. No. 681,474 filed Apr. 29, 1976, both now abandoned.

This invention relates to a process for providing a fluidized layer in heterogeneous systems, as well as to an apparatus for carrying out this process.

Customarily, tubular reactors or stirred vessels and/or stirred vessel cascades are utilized for conducting processes wherein, with two phases flowing cocurrently, the heavier phase must be kept in suspension. If a suspension is conducted through a tubular reactor, a minimum flow velocity is required to prevent the settling of the solid particles or to satisfy the needs of heat technology. However, on the other hand, in order to achieve the desired effect, e.g. a chemical reaction, a minimum residence time is required. This leads perforce to a large structural length and a correspondingly high expenditure, especially if it is necessary to heat or cool the reactor. Furthermore, any necessary degasification devices are very expensive.

With the use of stirred vessels or stirred vessel cascades, expensive and sensitive gaskets are required at the point where the agitator shaft penetrates the vessel, especially at high operating pressures and operating temperatures. Furthermore, the connecting elements between the individual stirred vessels are susceptible to clogging. The number and size of the stirred vessels are very limited, due to the manufacturing and operating expenditures necessary in this connection.

This invention is based on the problem of providing a process avoiding the aforementioned disadvantages and insuring that the disperse phase and/or phases in the continuous phase are maintained in suspension and are intensively fluidized with a minimum expenditure for the manufacture and operation of the system with maximum operating safety and flexibility of the associated apparatus.

In a heterogeneous liquid-solid system, the following phenomenon is known: If a particle swarm drops downwardly in a stationary or moving liquid within a vessel of sufficiently large dimensions, then there is no uniform distribution of the solid particles over the entire volume of the vessel during the settling process. Rather, clouds of particles are produced wherein there is a higher particle concentration than in the surrounding areas. In correspondence with the differences in the medium density of the cloud and the surrounding suspension, these clouds drop at a velocity which is much higher than the dropping velocity of the particle swarms. The suspension of a lower medium density, displaced thereby, ascends countercurrently in the upward direction. Once a cloud exceeds a critical velocity, it is disintegrated but, in turn, contributes to the formation of a new cloud.

Starting with this phenomenon, the invention provides, in order to solve the problem on which it is based, a process characterized in that:

(a) a heterogeneous mass stream with a liquid being the continuous phase and a solid and/or gas being the disperse phase is set into fluidized motion in a column between two plates arranged superimposed and inclined in opposition to each other with respect to the horizontal, the plates forming a fluidizing cell, with a fluidized motion being caused by the force of gravity;

(b) a heavier phase is enriched in a space or zone above the lower plate, especially in a lower region thereof, and flows from the space into a space below the lower plate;

(c) a lighter phase is enriched in another space or zone below the upper plate, especially in an upper region thereof, and flows from the other space into a third space above the upper plate and/or is discharged from the second space from the column, wherein a disperse phase (d) is conducted, in case the disperse phase has a density higher than that of the continuous phase and comprises a heavier phase in a direction from the top toward the bottom through the column; or (e) is conducted, in case the disperse phase has a density lower than that of the continuous phase and comprises a lighter phase in a direction from the bottom toward the top through the column. As has been discovered, it is possible in this way to stabilize and control the aforementioned phenomenon, which occurs in a coincidental manner, independently of the location, in a heterogeneous mass stream containing simultaneously the phases liquid-solid and/or liquid-gaseous and/or liquid-solid-gaseous, so that there are produced at a predetermined site, namely in the individual fluidized-bed compartment, advantageously a fluidized bed with an intense fluidization, therebelow an enrichment zone for the heavier phase, and thereabove an enrichment zone for the lighter phase. In this connection, the liquid always represents the continuous phase and the solids and/or the gas represent the disperse phase distributed in the liquid. The respective phase can be present as an inherently chemically uniform substance or also as a mixture of various materials. In the process according to the application the turbulent motion with intensive mixing extends practically over the whole internal cross section of the column, and separates the two enrichment zones.

The fluidization of the heterogeneous mass stream in accordance with this invention, wherein the components of this mass stream move along more or less closed circular, elliptical or the like flow paths extending in the longitudinal direction of the column, advantageously leads to an intimate mixing and a long residence time of the phases. It is also possible to superimpose on these vertical fluidization movements certain transverse flow directions, depending on the respective conditions of an individual case, without impairing the thus-obtained advantageous effect in the fluidized bed.

The energy for the generation and maintenance of the fluidized bed is here provided by the gravitational field of the earth due to the differences in the mean densities of the heterogeneous system in the two enrichment zones for the heavier and lighter phases pertaining to each plate. Due to the intense vertical turbulent motions, a premature settling of the heavier phase is avoided and an intense intermixing of the participating phases is insured. In contrast to the generally known fluidized bed of the system liquid-solid, the present system involves a self-fluidizing cell, a characteristic of which is that, for purposes of fluidization, it is unnecessary to provide a countercurrent stream introduced from the outside and flowing upwardly against gravity, but such a stream can be additionally utilized if this should prove advantageous in a certain case, for example in view of specific chemical reactions.

If the heterogeneous mass stream contains solid particles, the density of which is higher than that of the liquid, then this mass stream is introduced, in accordance with the process of this invention, at the head or top of the column and discharged at the bottom; whereas in a stream containing solid particles, the density of which is lower than that of the liquid, the stream is fed at the bottom of the column and withdrawn from the head. In this procedure, the fluidized layer than forms due to the ascending motion of the lighter particles. Corresponding procedures apply to heterogeneous systems with the other phases such as liquid-gaseous and/or liquid-solid-gaseous.

In a suitable embodiment of the invention, the provision is made to conduct the process wherein the continuous phase is conducted through the column in a direction from the top toward the bottom, and the flow resistance to be overcome by the lighter phase when passing into the space above the plate of the fluidizing cell is higher than that to be overcome by the heavier phase when passing into the space below the same plate of the fluidizing cell. In this connection, it proves advantageous, in general, with a view toward maximally stable flow conditions, if the flow resistance to be overcome by the lighter phase is considerably greater, preferably by more than three times, than that to be overcome by the heavier phase. This is of significance especially if, for example, for reasons of reaction technology the continuous phase or one of the disperse phases must be conducted with a negligible amount of remixing through the column. The flow resistance can be determined by correspondingly dimensioning the installation connecting the spaces at the topside and bottom side of the plates with each other, for example a bypass conduit on the column wall. The optimum values for this flow resistance as well as for the mutual spacing of the two plates depend on numerous influential variables, such as column cross section, flow characteristic of the individual components, differences in density, etc., so that is is suitable to fix the most favorable values by a few optimizing tests in a concrete individual instance.

Insofar as the density differences of the heterogeneous system are so minor that the energy, on the basis of the gravitational field alone, does not ensure a sufficiently intense fluidization, it is possible in accordance with another embodiment of this invention to withdraw additional energy from the pumping work required for transporting the heterogeneous mass stream, wherein the flow resistance to be overcome by the lighter phase when passing over into the space above the plates is preferably considerably higher than that to be overcome by the heavier phase when passing over into the space below the plates. More particularly, in this further embodiment the continuous phase is forced through the column by introduction under pressure and/or by withdrawing the phase by means of a pump.

According to another embodiment, wherein the heterogeneous mass stream in the column is set into fluidizing or turbulent motions successively with respectively opposed directions of rotation by being conducted through a column with three or more plates arranged in superimposed relationship and being inclined alternatingly in opposite directions. In this manner the invention provides to dispose several fluidizing cells one above the other, so that a self-fluidizing turbulence cell column is obtained. The mass stream moves in a meander shape through the entire column, whereby an especially advantageous utilization of the column height is possible. During this procedure, the fluidized layer of this invention and the two enrichment zones are formed in each individual fluidizing cell. Since these are formed already at relatively small substance streams, the flexibility of a column operated in accordance with the process of this invention is comparatively great, so that it is easy to adapt to varying load conditions.

Depending on the objective of the process taking place in the fluidizing cell and/or cell column, it is possible according to this invention to arrange on the fluidizing cell or cells inlet and/or discharge means for gas, steam, liquid and/or solid particles. Thus, in one embodiment of this invention, one or more components of the heterogeneous mass stream can be introduced separately from the other components into the fluidizing cells, for example in order to be able to introduce, during a chemical reaction, one of the reactants in adaptation to the chemical reaction increasing in the column from the bottom toward the top, into the individual fluidizing cells. According to an embodiment wherein this introduction is effected in a flow direction which supports the fluidizing effect on turbulence formation, this introduction can take place so that the fluidizing effect is thereby enhanced.

In another advantageous embodiment of the process of this invention part of the mass stream is withdrawn from the at least one fluidizing cell and is optionally reintroduced at least partially into this fluidizing cell or also into another fluidizing cell. Insofar as at least a portion of the withdrawn mass stream is reintroduced into the column, the crosscurrent reactor principle can be realized, for example. This is advantageous if undesired secondary and/or side reactions are to be suppressed. Here again, the inlet means can be designed, by the adaptation of the flow cross section and the direction into which they are oriented within the column, in such a way that the feeding process enhances the fluidization.

The column operated in accordance with the process of this invention can be used advantageously, for example, in place of stirred vessel cascades or tubular reactors, especially if these reactors must be operated by the crosscurrent method for reasons of product yield.

In order to conduct the process of this invention, there is provided an apparatus with at least two inclined plates covering the inside cross section of a cylindrical column, wherein respectively one means is provided in the enrichment zones, placing such zone into communication with the space on the other side of the plate, so that the enriched heavier and/or lighter phase is enabled to flow to the other side of the plates. In addition to the communicating means for the lighter phase, which is enriched in the upper region of the plates, or also in place thereof, a withdrawal means can be arranged to discharge the lighter phase, for example a gas, partially or also maximally completely from the respective fluidizing cells of the column. More particularly, the column comprises at least two plates arranged at a mutual spacing and being inclined in opposite directions with respect to the horizontal, these plates forming a fluidizing cell, first fluid connecting means in the lower end region of each of said plates placing the space above the plate into communication with the space below the plate, and second fluid connecting means in the region of the upper end of each of the plates, connecting the space below the plate with the space above the plate and/or a discharge means for the space below the plate.

The plates are fashioned, for example, as planar sheets which, in case of a circular-cylindrical column, have an elliptical contour and are arranged within the column at mutual spacings in a respectively offset fashion, being inclined preferably by about 180°. The fluid connecting means in the region of the lower and upper ends of the plates can be fashioned, for example, as bypass conduits attached to the outside of the column. However, it is normally more advantageous to provide the connecting means in the form of at least respectively one passage, for instance in the shape of a slot, gap, or hole, at the rim of the plates, i.e. directly at the inner wall of the column, or also at a certain distance therefrom within the plates. The flow cross section of the connecting means and also of the optionally present discharge means is selected so that due to the pressure gradient which is built up on the respective plate between the two enrichment zones with the mass stream being introduced at the top of the column, the heavier phase flows with sufficient velocity into the space below the plate and/or with the mass stream being introduced from below into the column, the lighter phase flows due to its buoyancy with sufficient speed into the space above the plate, again reaching in the adjacent fluidizing cell a maximally intense fluidization. This flow characteristic is generally taken into account expediently, with the liquid phase being introduced into the column at the top, if the cross sections are dimensioned so that the free passage cross section of the connecting means in the lower region of the plates is larger than that in the upper region of the plates.

In order to be able to introduce, in a controlled fashion, one or also several components of the heterogeneous system into the individual fluidizing cells, special feed or inlet means can be provided which are preferably designed so that the feeding process supports the fluidization. More particularly, the inlet means for the space above the plates are provided in the upper region of the plates.

The angle of inclination of the plates depends on the type of heterogeneous system present in an individual case. Thus, for example, in case of a mass stream with a heavier, particulate solid phase, the angle of inclination will preferably be chosen to be just so large that such a loose layer of solids is accumulated in the lower region of the plate, i.e. above the lower connecting means, that the optimum pressure gradient required for the fluidizing motion is ensured at the respective plate. If the angle is selected to be too large, i.e. if the plate is inclined too greatly, then there is the danger that bridges are formed of the solid layer in the lower region of the plate, between this layer and the column wall, and the continued flow into the space below the plate is impaired or even prevented. Also, the structural height of the column is unnecessarily increased thereby. In contrast thereto, the relationships are different in case of a heterogeneous system with the phases liquid-gaseous, since here large enrichment zones and correspondingly large angles of inclination prove to be advantageous. Since there is no particulate, solid phase, there is no danger of an interfering bridge formation. With a view toward a maximally economical process operation, it is again recommended to determine the angle of inclination most favorable in each particular instance by means of optimization. Normally, this angle will be between about 30° and 60°, measured with respect to the horizontal.

According to one embodiment of the invention, the additional arrangement of a deflecting means can be effected above the at least one upper passage; this means is preferably shaped as a baffle plate held by means of a spacer element at a distance from the plate, for example. This baffle plate prevents the lighter phase from flowing, under adverse conditions, directly in the marginal zone of the column in the upward direction to the next plate, since the baffle plate is firmly joined in its upper region to the plate or the column, so that here the mass stream cannot pass, i.e. the mass stream is forced to pass between the lower region of the deflecting means and the downwardly inclined plate. In this connection, the lighter phase has superimposed thereon a velocity component in the direction toward the downwardly inclined plate, the size of this compound being affected by the extent to which the deflecting means covers the at least one upper passage.

It proves to be especially advantageous to fashion the deflecting means so that it covers with its lower region a portion of the plate adjoining the at least one upper passage in the downward direction and forms a flow channel, whereby the lighter phase is forced to flow downwardly in the upper region of the plate along the latter, thereby supporting the fluidization. The extent of support of the fluidization can be controlled by covering the at least one upper passage and the plate section adjoining thereto in the downward direction. The deflecting means in total provides an advantageous improvement of the degree of plate efficiency and increases the load range or the flexibility of the column.

In case of systems with the phases liquid-solid, it proved to be advantageous to fashion the plates with at least one lower passage in the marginal zone of the plates, and so that the inclined plates have, in the lower region, a section of a lower inclination with respect to the horizontal, preferably a horizontally arranged section, followed by the at least one lower passage. This is especially advantageous if the difference between the density of the heavier solid particles and the liquid is smaller than 0.4 g./cm$^3$, preferably smaller than 0.2 g./cm$^3$, and the average diameter of the solid particles is smaller than 200$\mu$, preferably smaller than 50$\mu$. This section of lower inclination leads to a solids enrichment in the lower region of the plate due to a directional deflection of the suspension stream when reaching the section of lower inclination and on account of the increasing impingement angle of the suspension stream on the column wall. At the same time, the flow conditions are stabilized in the at least one lower passage. Thus, a further improvement in the degree of plate efficiency is attained. The required spacing between the plates can be reduced, the total height of the column can be decreased, and thus the manufacturing and operating expenditures can be lowered.

According to yet another embodiment, this section of lower inclination can be provided with additional passage openings which can be, for example, in the shape of slots, of circular shape, of rectangular shape, or the like. This measure is advantageous, in particular, if in a system with the phases liquid-solid, the aforementioned density difference is larger than 0.2 g./cm$^3$ and the average particle diameter is larger than 100$\mu$. This results in an additional enrichment of the heavier solids in the zone of the plate section of lower inclination and/or in the zone of the at least one lower passage, and an increased stabilization of the falling suspension stream is attained, which passes through the lower passage from the top toward the bottom; this, in turn, has a favorable effect on the degree of plate efficiency. Furthermore, a narrower residence time spectrum is attained, since particles moving above a plate in the fluidizing movement of this invention along an external flow path will preferably enter an inner flow path during passage to the next-lower plate, and conversely.

To have a controlled effect on the pressure loss in the region of the connecting means of a plate, a control device can be provided by means of which the flow resistance to be overcome by the lighter phase when passing from the space below the plate to that above the plate is variable. This device can be operated from the outside either manually or by automatic control. This control device is preferably arranged in the region of the at least one upper passage so that the device can change the free flow cross section between the column wall and the upper region of the plate. The device can be fashioned, for example, as a pivotable flap or as an adjustable slide. By this intentional control of the pressure loss on the plate, it is possible, for example, to vary the solids concentration in the region of the at least one lower passage, the column can thus be adapted to differing starting materials and the degree of plate efficiency can be adjusted to an optimum value.

If, in heterogeneous systems with a solid phase, there is the danger that solid particles settle on the plates and thus adversely affect the flow conditions, for example in that these particles are detached again uncontrollably in more or less large, lump-shaped pieces and then block the connecting means, a further embodiment provides to fashion the endangered portions of the plates to have an additional inclination. This danger exists particularly in the lower zone of the plates on both sides of the connecting means. The plates, for this purpose, can be formed to be inherently angled or, if they are initially planar, they can be provided with attachment sheets, panels, strips, or the like mounted at an inclination to the interior of the plate, the size of these attachments being adapted to the endangered regions.

The invention will be explained in greater detail with reference to the embodiments illustrated in the drawings. The figures show, schematic views in longitudinal and cross sections:

FIGS. 1a and 1b illustrate a longitudinal sectional view and a transverse sectional view, respectively of a column with indicated fluidized layers or beds and enrichment zones;

FIGS. 2a, 2b, and 2c show a longitudinal sectional view, a transverse sectional view, and a cutout of a longitudinal sectional view, respectively, of a column with forced conveyance;

Figure 1A:
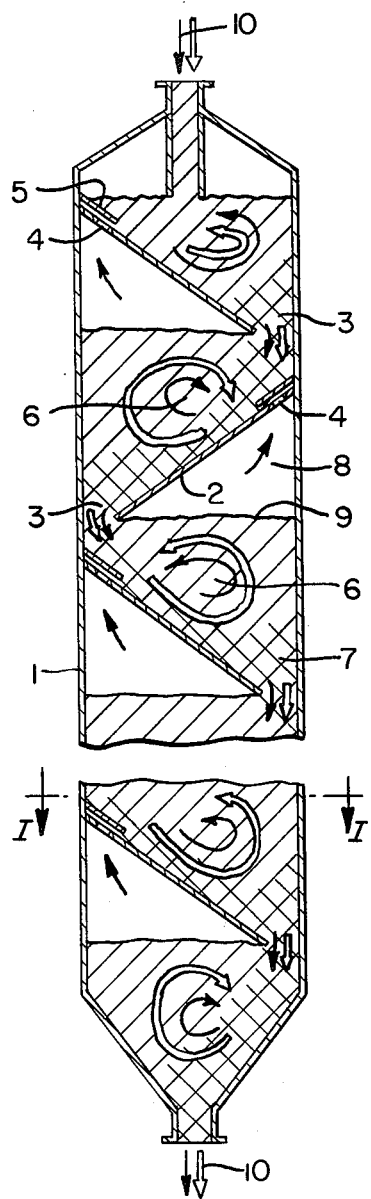

According to FIG. 1a, the heterogeneous mass stream 10 is fed to the column 1 from above; the heavier phase of this stream is denoted by the double arrow and the lighter phase by the single arrow. The plates 2 are arranged in the interior of the column 1 in superimposed relationship and respectively offset by 180° in an inclined orientation and are fashioned as planar plates with respectively one passage 3, 4 at the lower end or in the region of their upper end, respectively. Above the upper passage 4, at a spacing therefrom, the deflecting means 5 is mounted. The mass stream 10 moving downwardly through the column 1 on account of gravity and exiting at the base of the column, is deflected above the plates 2 into a vertical fluidized motion, the direction of rotation of which is reversed from one plate to the next. Underneath the fluidized layer 6, the heavier phase is accumulated in the region 7—indicated by the cross hatching—whereas above the fluidized layer 6 and below the upper passage 4 the lighter phase is accumulated in the region 8. The fluidized layer 6 enclosed by respectively two plates 2 and the two enrichment zones 7, 8 constitute self-fluidizing turbulence cells and these, in conjunction, the self-fluidizing turbulence cell column. Between the fluidized layer 6 and the upper enrichment zone 8, the interface 9 is formed in a clearly visible manner. The heavier phase is fed to the fluidizing cell disposed next in the downward direction via the lower passage 3. During this step, the lighter phase is, of course, also entrained, since this phase, after all, is likewise withdrawn at the bottom of column 1. A phase separation then takes place in the respective fluidizing cell, in that the lighter phase is accumulated in zone 8, reenters through the upper passage 4 the fluidizing cell disposed next thereabove, participates there in the fluidizing motion, and thereafter exits again through the passage 3 in the downward direction. A proportion of the lighter phase thus seems to circulate about the respective plate 2.

Figure 1B:
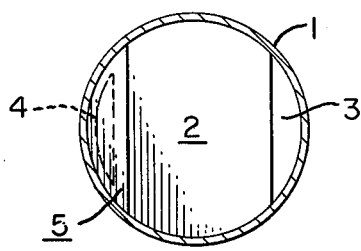

FIG. 1b shows a cross section along line I—I in FIG. 1a, showing the arrangement and shape of the passages 3, 4 and of the deflecting means 5.

The open area of the lower passage is 5 to 20%, advantageously 10 to 15% of the internal cross section of the column. The open area of the upper passage is between 0.1 and 7% of the internal cross section of the column. The term "area of the passages" in the sloped plates refers to a projection on a horizontal plane.

In determining the size of the passages, among other things the following conditions are important but they are not absolute in any specific case. The lower passage must be large enough and have such configuration that no bridges of solid material will form in a system that has a solid phase. Further, the passage must be big enough so that on the one hand a suspension in the zone of the lower passage will remain capable of flowing, and on the other hand no more fluid must be entrained through the lower passage than is precisely necessary for the flowability of the suspension in this zone. The configuration and size of the lower passage in case of a liquid-solid-gas system must be so selected that the throughput rate in the lower passage will be greater than the rate of ascent of the gas bubbles. The size and configuration of the upper passage is to be such that because of the loss of pressure that occurs there, the rate of ascent of the fluid below the floor will be greater than the rate of descent of the particles. In a liquid-solid-gas system the upper passage must only be big enough so that there will always be a gas cushion under the floor, to prevent a possible back-mixing of the fluid.

The vertical distance between the plates is governed by their angle of tilt, by the properties of the material of the fluid system, and the absolute size of the column. In general $$\Delta H = (0.5 \text{ to } 2) \cdot D$$

ΔH is the distance between adjacent plates, measured in the long axis of the column. Internal diameter of the column is D. In the matter of material properties of the fluid system, the heaping angle of the solid material, the difference in density between solid and fluid, and particle size of the solid material are important, for instance.

The plates may not all be the same size or have the same slope with reference to the horizontal. Thus for example the lower passage of the uppermost floor of a column may have smaller dimensions than in the remaining floors. To prevent deposition of solid material on the topmost floor, either its slant has to be greater than that of the others, or the upper passage of this floor must be bigger than that of the other floors. The floors do not unconditionally have to be shifted by 180° with reference to each other, so that no two plates will lie in planes parallel to each other, although that is the preferred arrangement. In a fluid-gas or liquid-solid-gas system, it may be advantageous for instance to turn the floors by only 90° with reference to each other, in order that just by the geometric arrangement of the floors a situation will be prevented in which the upwardly moving gas bubbles would go off immediately through the lower passage of the next higher floor.

This column can be used, for example, for removing the silicic acid bound in a crystalline fashion to zirconium oxide. In the melt, zircon sand ($ZrSiO_4$) is reacted to form zirconium oxide ($ZrO_2$) and silicic acid ($SiO_2$). In spite of grinding the cooled-off rock ($ZrO_2+SiO_2$) extremely fine and conducting a subsequent flotation step, a separation of the silicic acid, bound in a crystalline fashion to the zirconium oxide, takes place only to an incomplete extent. A higher purity of the zirconium oxide is attained by dissolving the silicic acid in sodium hydroxide solution according to the equation

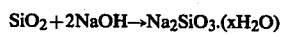

$$SiO_2 + 2NaOH \rightarrow Na_2SiO_3 \cdot (xH_2O)$$

The reaction takes place the more rapidly and the more completely, the more intense is the fluidization of the ($ZrO_2+SiO_2$) particles in the sodium hydroxide solution while maintaining a minimum residence time, and the higher the temperature and thus perforce the pressure, under which the reaction takes place. For this purpose, the self-fluidizing turbulence cell column can be advantageously utilized, since this is an apparatus without moving parts and thus without sealing problems. To cover the heat losses, it is advantageous to feed to the individual fluidizing cells additionally steam in accordance with FIGS. 3a and 3b by means of special feeding units 12. The suspension flows through the column from the top toward the bottom, wherein the purity of the zirconium oxide particles increases from one fluidizing cell to the next.

This embodiment is further exemplified as follows:

System: Zirconium oxide contaminated with silicic acid—sodium hydroxide solution.

Objective: Purification of the zirconium oxide by dissolving the silicic acid in sodium hydroxide solution.

Apparatus: Column having a rectangular cross section 30×80 mm., height 2000 mm.

Installations: Eight inclined plates; spacing between the same points 200 mm.; inclination with respect to the horizontal 40°; inside cross section of the lower passage 225 mm², inside cross section of the upper passage 6 mm².

Throughput: 160 l./h. of suspension with 50 g. of zirconium oxide per liter of sodium hydroxide solution; particle size of the zirconium oxide between 10 and 50μ.

Purity: Starting product 2–3% by weight of silicic acid in the zirconium oxide; final product 0.3–0.4% by weight of silicic acid in the zirconium oxide.

Figure 2A:
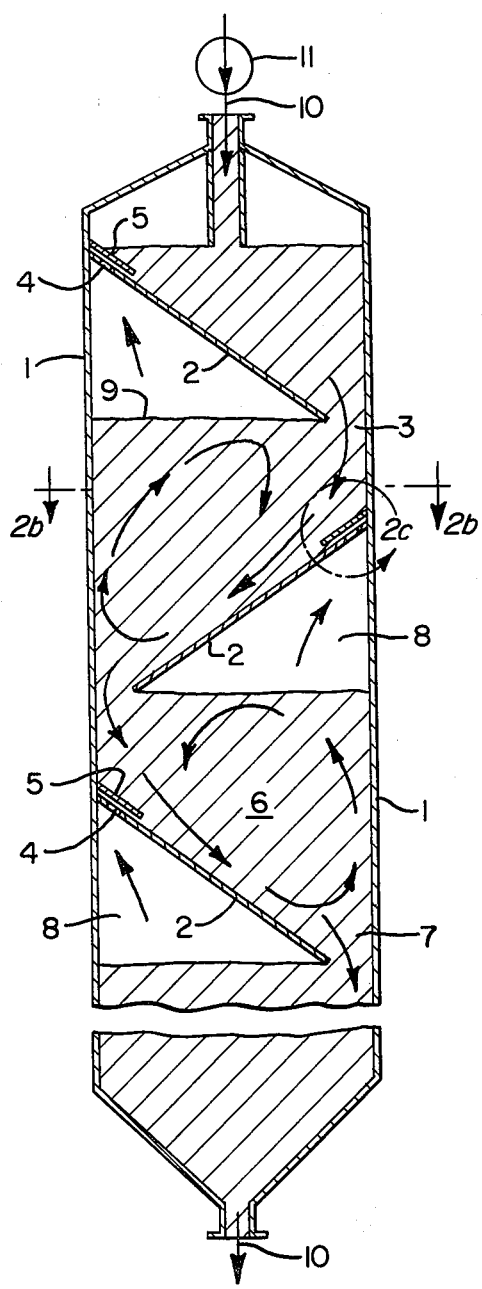
Figure 2C:
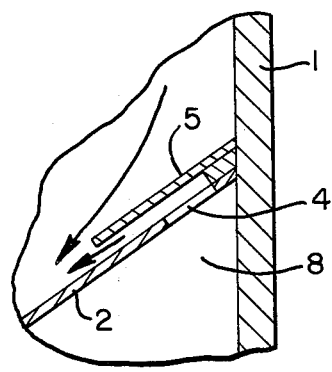

The heterogeneous mass stream 10, now indicated merely by a single arrow, is fed from above by means of the pump 11 in the column 1 shown in FIG. 2a, so that this mass stream is forced through the column 1 by being introduced under pressure. The upper passage 4, in this embodiment as contrasted to FIGS. 1a and 1b, is designed to be still substantially smaller than the lower passage 3, as indicated by the enlarged representation shown in FIG. 2c which is the portion within circle X in FIG. 2a. Due to the longitudinal length of the upper passage 4, a relatively large pressure loss occurs in this passage. Furthermore, due to the direction in which the passage is oriented, a vacuum also occurs at its outlet. Consequently, the volume stream conducted from the top toward the bottom passes only through the lower passages 3, rather than through the upper passages 4. Through the passage 4 passes, in accordance with the pressure difference at its topside and bottom side, only an upwardly directed volume stream from the enrichment zone 8 of the lighter phase. If a continuous stream flows through the column 1, there must be present, according to the continuity principle, in the lower passage 3 a higher velocity corresponding to the ratio of column cross section to the area of the lower passage 3. The resultant discharge impulse at the lower passage 3 ensures the intensive fluidization in the fluidizing cell disposed therebelow on account of an additional utilization of the pump energy.

Figure 2B:
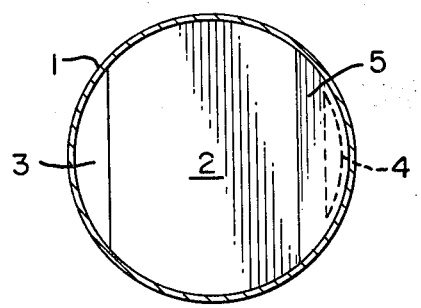

FIG. 2b shows a cross section along line II—II in FIG. 2a with the plate 2, the passages 3, 4, and the deflecting means 5.

Figure 3A:
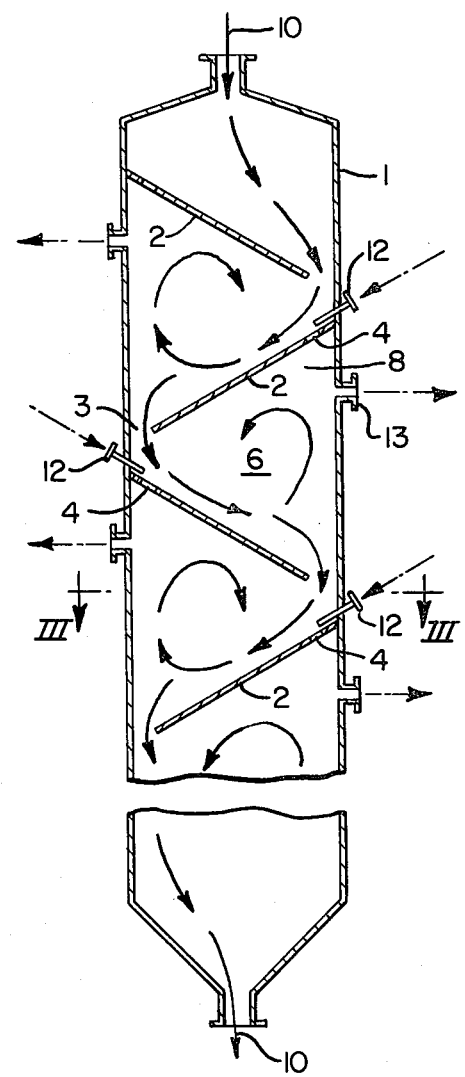
FIGS. 3a and 3b show a longitudinal sectional view and a transverse sectional view, respectively, of a column with inlet and discharge means.
Figure 3B:
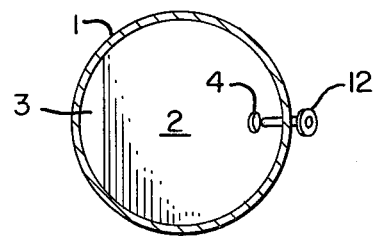

In FIGS. 3a and 3b, a column 1 is shown with additional inlet means 12 and discharge means 13, in order to realize the crosscurrent reactor principle, for example. The inlet means 12 for a gaseous reactant, for example, are fashioned as pipes, the outlet opening of which is disposed above the circular upper passage 4, so that the lighter phase flowing upwardly through the passages 4 is additionally dispersed by means of the introduced reactant. The discharge means 13 can be arranged in the region of the enrichment zone 8 and/or the fluidized layer 6, depending on the circumstances.

Figure 4A:
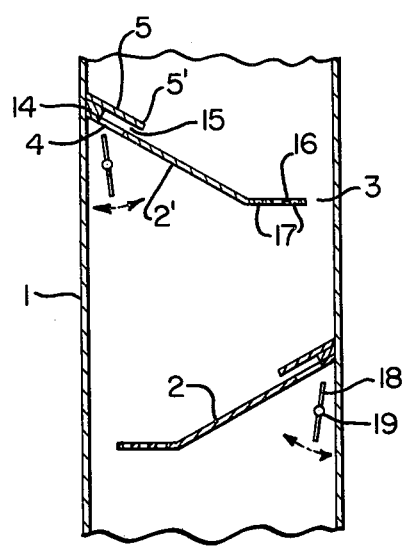
FIGS. 4a and 4b show a longitudinal sectional view and a transverse sectional view, respectively, of a column fragment having a special plate configuration.

The column 1 shown in a fragmentary view in FIG. 4a, with the plates 2, of which only two are shown herein and the inclination of which with respect to the horizontal is opposite from one plate to the next, comprises in the lower zone of the plates 2 the lower passage 3 and in the upper region the upper passage 4. The plates 2 are essentially planar plates, but could also be, for example, curved or angled; for example, they can be curved or angled about one or optionally also several axes extending the direction from the upper passage to the lower passage, insofar this should prove advantageous for reasons of strength, for affecting the flow conditions, to avoid settling of the solid particles on the plates, or the like. On the topside of the plates 2, the panel-like deflector 5 is arranged by way of the spacer element 14; this deflector here has the shape of a circle segment and covers not only completely the upper passage 4, but also extends with its lower region 5' over the portion 2' of the plate 2 adjoining the upper passage 4 toward the bottom, so that the flow channel 15 is formed between the two parts.

In the lower region, adjoining the lower passage 3, the plate 2 has the section 16 which is shown herein to be integral with the plate 2, but which can also be attached thereto as a separate component. The inclination of this section 16 is lower with respect to that of the plate 2 and in this case is 0°. Instead of fashioning the section of lower inclination as one planar component, it is also possible to provide a configuration where the section is curved about an axis at right angles to the plane of the drawing, or to fashion this section of several elements, each of which has the shape of a planar strip, between which—as seen in the plane of the drawing—a more or less large bend is formed. The section 16 has the additional passage openings 17 which here are designed as rectangular slots arranged in three rows one beside the other and permit the additional passage of the heavier phase.

The control device 18 is arranged below the upper passage 4 and is fashioned here as a flap pivotable from the outside about the horizontal axis 19 in accordance with the arrow; this flap is dimensioned so that it can optionally block the flow path to the upper passage 4 completely.

Figure 4B:
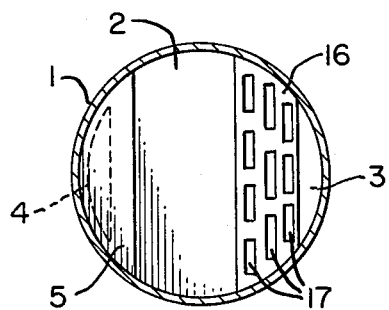

The top view of the uppermost plate 2 of FIG. 4a, shown in FIG. 4b, clearly illustrates the form of the plate 2, the two passages 3, 4, the deflecting means 5, and the additional passage openings 17 in section 16.

Figure 5A:
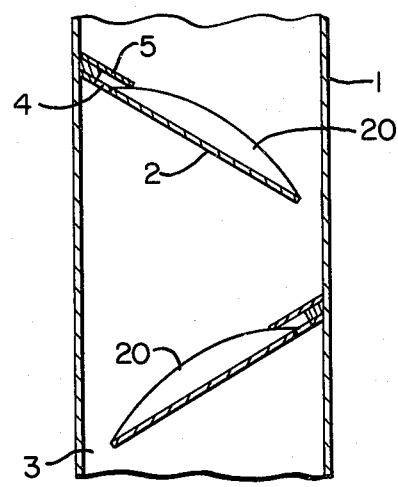
FIGS. 5a and 5b show a longitudinal section view and a transverse sectional view, respectively, of a modification of a column.
Figure 5B:
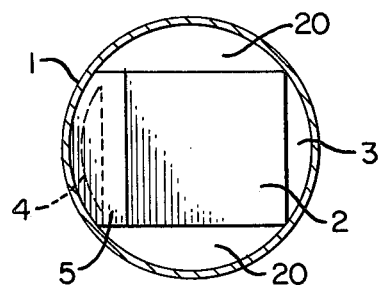

According to the column fragment shown in FIG. 5a, the plates 2 are provided, between the passages 3, 4, with lateral guide means 20 dropping from the column wall toward the interior and preventing an undesired settling of the solid particles on the plates 2. The baffle means 20 are fashioned to be integral with the plate 2, but they could also be manufactured separately therefrom and then attached by screws, by welding, or the like. FIG. 5b shows the uppermost plate 2 of FIG. 5a in a top view.

What is claimed is:

1. A process for the production and maintenance of a fluidized layer in a heterogeneous system which comprises:

(1) introducing a liquid as a continuous phase and a solid and/or gas as a disperse phase cocurrently into a contact column to provide a heterogeneous mass stream at one end of said column, one of said phases having a density greater than the other, said column having a plurality of fluidizing cells provided by at least three inclined plates that are vertically arranged one above the other, each plate being inclined in opposition to the next, covering at least a major proportion of the inside cross-section of the column and having a first flow passage at the lower end and a second flow passage at the upper end, with each two of the plates inclined in opposition to one another forming a fluidizing cell therebetween, one or more components of the heterogeneous mass stream being introduced into the at least one fluidizing cell separately from the remaining component or components by inlet means arranged above the lower plate of the two plates inclined in opposition to one another forming a fluidized cell therebetween, said inlet means directing the one or more components along the lower plate;

(2) forming in each of the fluidizing cells a fluidized layer from the continuous and disperse phases within said contact column by effecting the following operation:

(a) setting the liquid continuous phase and the solid and/or gas disperse phase into a fluidized motion in said column between two plates forming one of said by fluidized cells, wherein the fluidized motion is promoted by the force of gravity, due to the difference in the densities of said phases;

(b) forming a heavier mass phase containing portions of the disperse and continuous phases above the lower plate of the two plates of said one fluidizing cell to form a first enrichment zone in said one cell and causing said heavier phase to flow from said first enrichment zone through the first passage into a second fluidizing cell below the lower plate;

(c) forming a lighter mass phase containing portions of the disperse and continuous phases below the upper plate of the two plates defining said one cell to form a second enrichment zone in said one cell and causing the lighter phase to flow from the second enrichment zone through the second passage into a third fluidizing cell above the upper plate;

(d) establishing a pressure gradient at each plate that is located between a first enrichment zone of one of said fluidizing cells and a second enrichment zone of the other cell due to the difference in flow resistance provided by the first and second flow passages provided in the plate whereby the heterogeneous mass stream is set into a vertical rotational fluidized motion within each of the fluidizing cells; and (3) discharging the heterogeneous mass stream from the other end of the column.

2. A process according to claim 1, wherein said introduction is effected in a flow direction which supports the fluidizing motion.

3. An apparatus for the production and maintenance of a fluidized layer in a heterogeneous system which comprises a vertical contact column having a plurality of successive, vertically arranged fluidizing cells and inlet means located at one end of said contact column for cocurrently introducing a liquid and a solid and/or gas into one end of said column to provide a heterogeneous mass stream containing the liquid as a continuous phase and the solid and/or gas as the disperse phase, the continuous phase having a density different than that of said disperse phase, a plurality of plates arranged superimposed and inclined in opposition to each other with respect to a horizontal plane, each of said plates covering the inside cross-section of the column in each two plates inclined in opposition to another forming a fluidizing cell therebetween; in the region of the lower end of each plate a fluid flow connecting means placing the space above the plate in communication with the space below the plate and in the region of the upper end of each of the plates, a discharge means for discharging a portion of the heterogeneous mass stream from a space below the plate and having a flow resistance different from the flow resistance of said fluid flow connecting means, the difference in flow resistance between the fluid flow connecting means and the discharge means providing means for establishing a pressure gradient across each plate positioned between two fluidizing cells, whereby the heterogeneous mass stream is caused to flow from one fluidizing cell to the next fluidizing cell with a vertical rotational motion being imparted to the heterogeneous mass stream within each of the fluidizing cells of the column, said motion being further promoted by the force of gravity due to the difference in density of the continuous and disperse phases, another inlet means for introducing a gas into the space above the lower plate of the two plates providing a fluidizing cell therebetween, said another inlet means directing the gas along said lower plate and means located at the other end of said column for discharging a resultant homogeneous mass stream from the other end of said column.

4. An apparatus according to claim 3, further comprising pumping means for providing increased flow of the liquid and the solid and/or gas from one end of the column to the other end.

5. An apparatus for the production and maintenance of a fluidized layer in a heterogeneous system which comprises a vertical contact column having a plurality of successive fluidizing cells and inlet means located at one end of said contact column for cocurrently introducing a liquid and a solid and/or gas into said column to provide a heterogeneous mass stream containing the liquid as a continuous phase and the solid and/or gas as the disperse phase, the continuous phase having a density different than that of said disperse phase, a plurality of plates arranged superimposed and inclined in opposition to each other with respect to a horizontal plane, each of said plates covering the inside cross-section of the column and each two plates inclined in opposition to another forming a fluidizing cell therebetween; in the region of the lower end of each plate a first fluid flow connecting means placing the space above the plate into communication with the space below the plate and in the region of the upper end of each of the plates, a second fluid flow connecting means placing the space below the plate in communication with the space above the plate and having a flow resistance different than the flow resistance of said first fluid flow connecting means, the difference in flow resistance between the first and second flow connecting means providing means for establishing a pressure gradient across each plate positioned between two fluidizing cells, whereby the heterogeneous mass stream is caused to flow from one fluidizing cell to the next successive fluidizing cell with a vertical rotational motion being imparted to the heterogeneous mass stream within each of the fluidizing cells of the column, said motion being promoted by the force of gravity due to the differences in density of the continuous and disperse phases, another inlet means for introducing a gas into the space above the plates being provided in the upper region of the plates, and means located at the other end of the contact column discharging the resultant heterogeneous mass stream from said column.

* * * * *